June 15, 1937. E. E. WITTKOPP 2,083,766
TIRE AND RIM CONSTRUCTION
Filed July 1, 1935 4 Sheets-Sheet 1
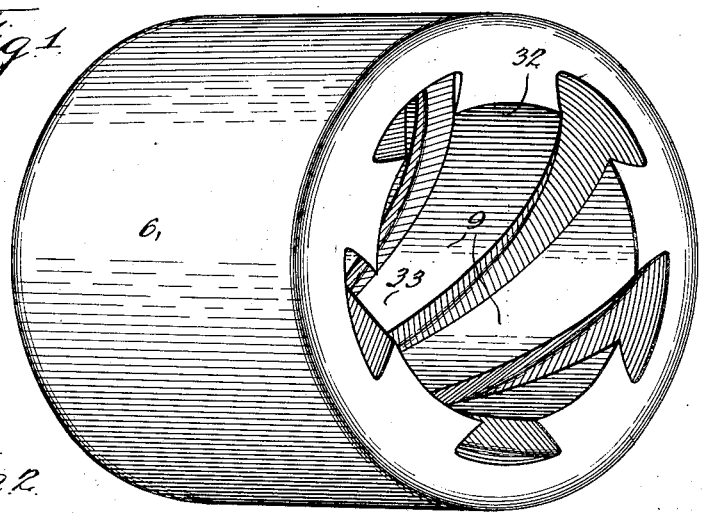
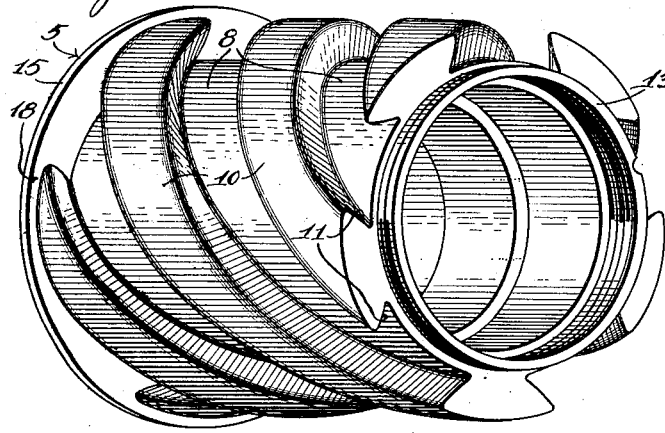
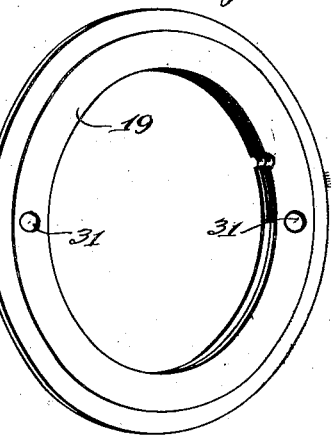
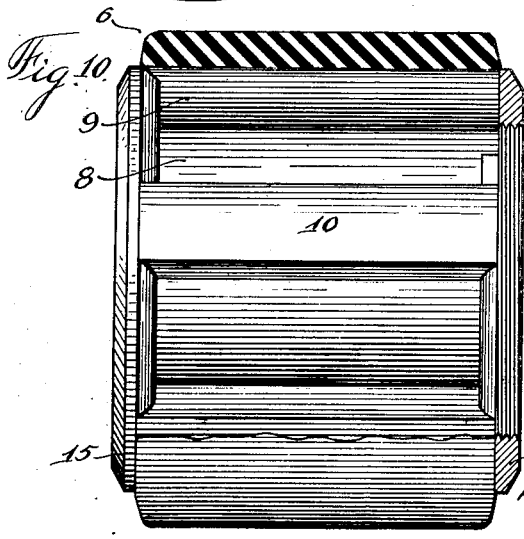
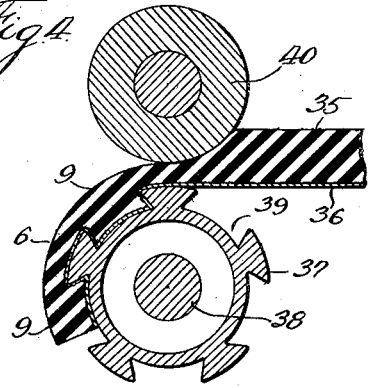
Inventor:
Edwin E. Wittkopp.
By Jones, Addington, Ames & Selebel.
Attys.

June 15, 1937. E. E. WITTKOPP 2,083,766
TIRE AND RIM CONSTRUCTION
Filed July 1, 1935 4 Sheets-Sheet 2
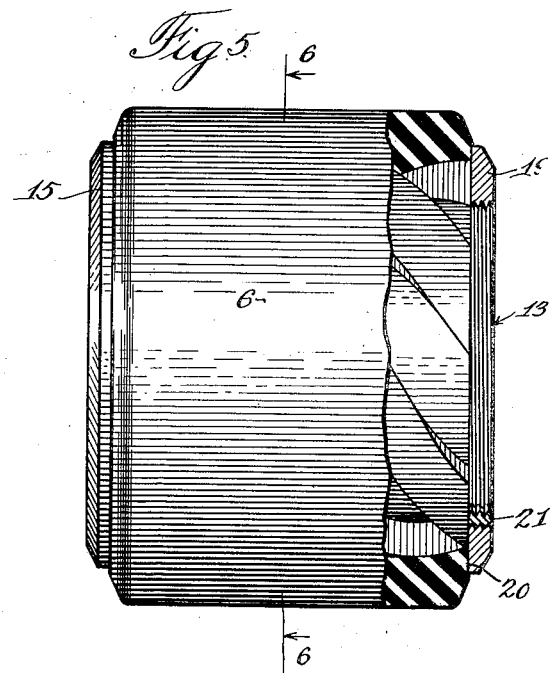
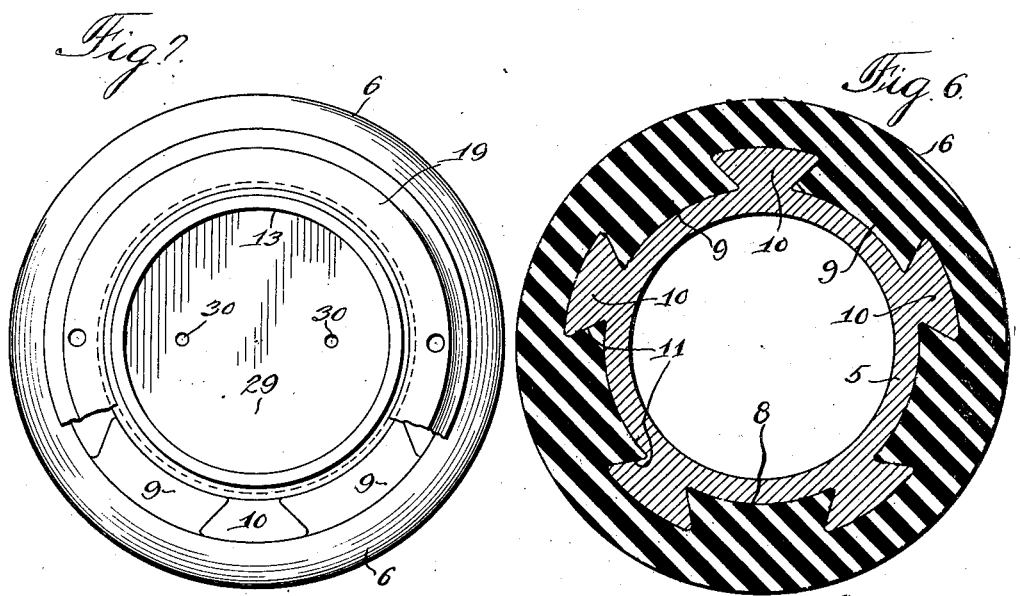
Inventor:
Edwin E. Wittkopp.
By Jones, Addington, Ames & Seibold.
Attys June 15, 1937.  E. E. WITTKOPP  2,083,766
TIRE AND RIM CONSTRUCTION
Filed July 1, 1935  4 Sheets-Sheet 3
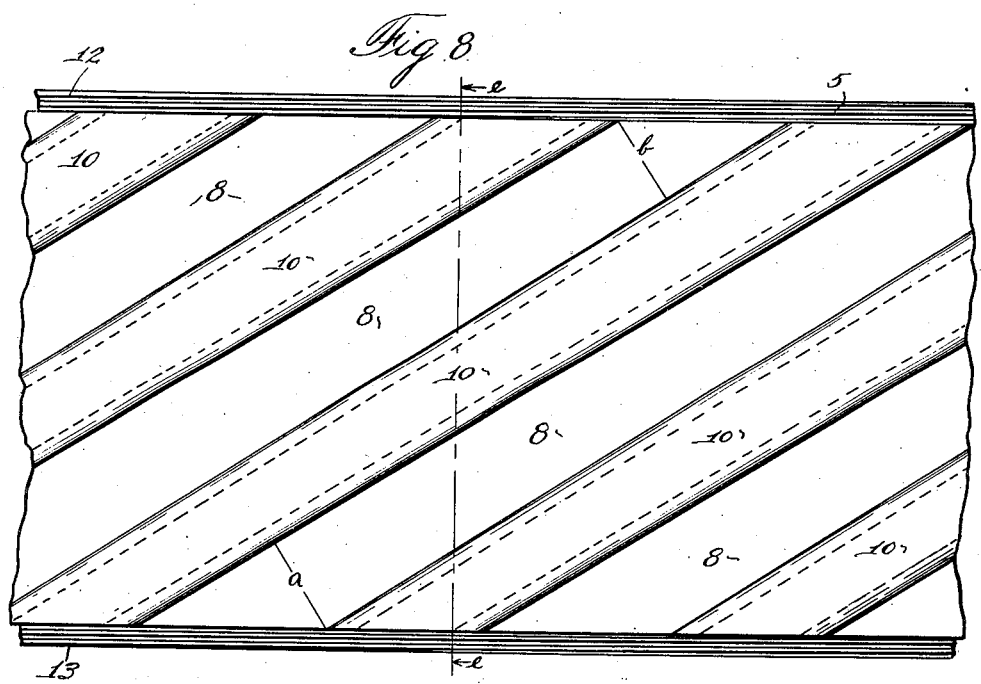
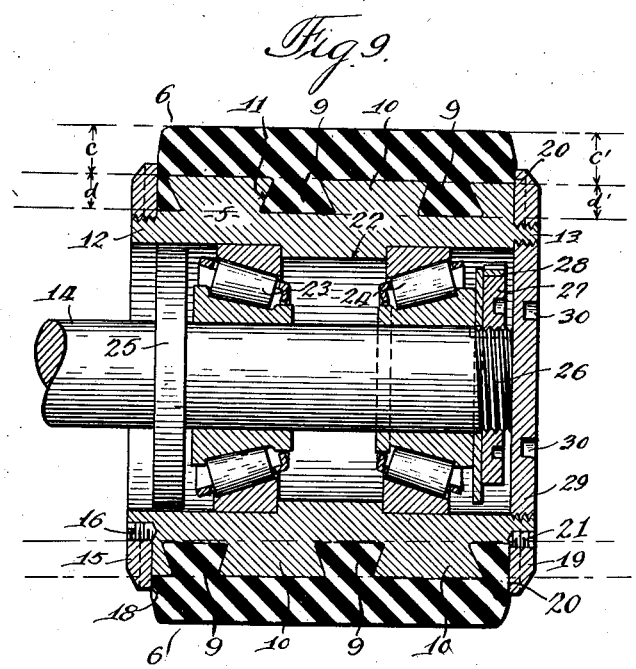
Inventor:
Edwin E. Wittkopp
By Jones, Addington, Ames & Seibold
Attys.

June 15, 1937. E. E. WITTKOPP 2,083,766
TIRE AND RIM CONSTRUCTION
Filed July 1, 1935 4 Sheets-Sheet 4
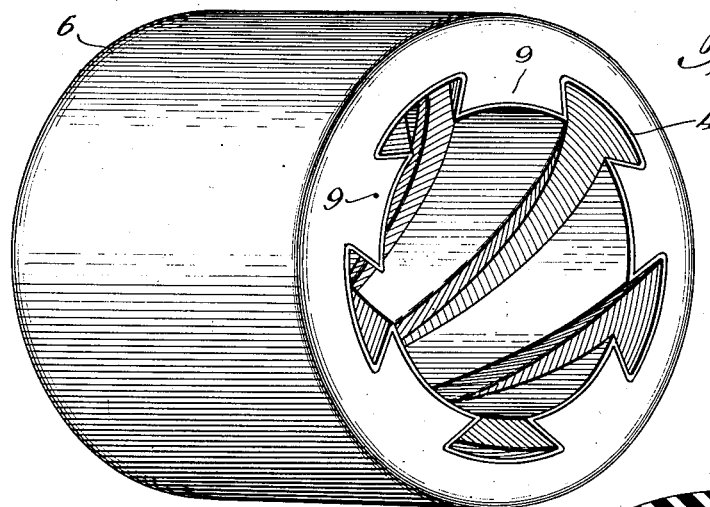
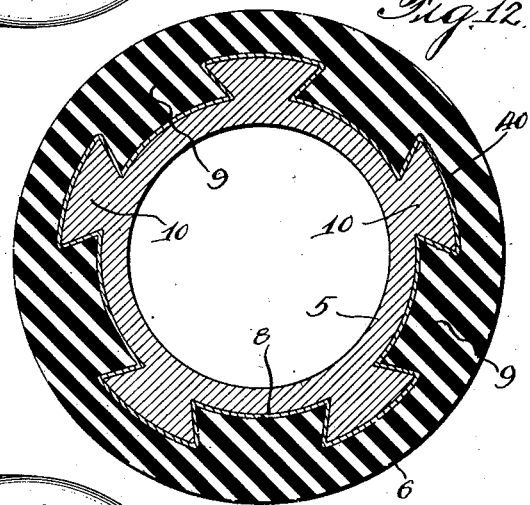
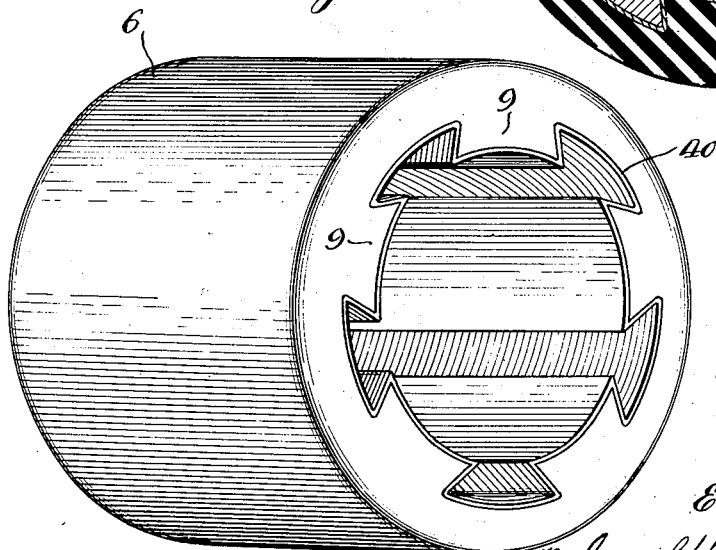

Patented June 15, 1937

2,083,766

UNITED STATES PATENT OFFICE 2,083,766

TIRE AND RIM CONSTRUCTION

Edwin E. Wittkopp, Chicago, Ill.

Application July 1, 1935, Serial No. 29,285

17 Claims. (Cl. 152—6)

My invention relates to tires for vehicle wheels and more particularly to a tire and rim construction, the tire adapted to be fitted upon the rim by a sliding movement, being held thereon preferably by a spiral interlock, including spiral dovetail recesses in the periphery of the rim and cooperating spiral dovetail splines on the tire.

The present invention is, in certain respects, although not exclusively, an improvement upon my Tire and rim construction, for which, on February 7, 1928, I was granted United States Letters Patent No. 1,658,623. In said patent I have described a tire and rim construction in which sectional rubber blocks are fitted to the rim by a spiral movement, there being spiral portions on the sections engaging in spiral recesses in the rim to lock these sections to the rim. Although the present invention is not limited to being merely an improvement upon my prior construction, in certain aspects it is an object of the present invention to provide specifically an improved tire and rim construction wherein means are employed to increase the load carrying capacity of the tire, and, due to its construction and use, to provide the tire in the form of a shell and the rim in the form of a core, the shell being adapted to be easily slipped, by a spiral movement, on and off the core.

In my prior construction, each tire segment could be designed to be of sufficient body to prevent its spiral dovetail portion from pulling out of its spiral dovetail recess when the tire and rim were intended for normal use upon motor trucks or the like. But for small diameter wheels used upon platform and warehouse trucks, a more difficult problem arises at times in the design of individual segments, because the load becomes excessive for the body portion of each segment, it being found in certain instances that the segments would tend to tear from the rims while the tread portions occasionally would tend to break from the spiral dovetail portions held in the spiral recesses in the rims. Not only in this type of tire construction but also in roller construction, such as printing rollers, washing machine rollers, typewriter rollers, etc., to which the present invention is well adapted, the limited diameter does not therefore admit as well of individual segment construction, nor of a design of body portion providing for sufficient strength to keep the various segments in position. As the result of the present invention, I find that it is preferable to secure this necessary strength and body portion by distributing the load strain over a larger tread surface, this being obtained by providing the tire or roller in the form of a shell carried by the core, the shell being of a construction admitting of easy replacement upon the core and of sufficient strength and wearing qualities to overcome the difficulties of the individual segment construction. Moreover, I find that the spiral dovetail portions on the shell may be arranged in a manner distributing the load over a greater area of the body of the shell so that the load strains will not be concentrated at any one part, thereby advantageously increasing the life of the shell as well as its efficiency in carrying heavier loads.

The holding effect between the shell and core is greatly increased by the single piece construction of the shell upon the core. The close proximity of the splines and the overlying relation of one to the other tend to bring the body portion as a unit tightly against the core, this tendency being noted particularly by a hugging effect of the shell about the entire circumference of the core. Accordingly, I have found that the gripping action of the spiral dovetail splines is not only increased by the shell construction of the tire but that there is a decided tendency for the body portion of the shell to hug the core tightly about its entire circumference.

Other objects and advantages of the invention will be apparent from the following detailed description taken in connection with the following drawings which form a part hereof.

In the drawings:

Figure 1 is a perspective view of a shell embodying the invention;

Fig. 2 is a similar perspective view of a core embodying the invention;

Fig. 3 is a similar view of one of the removable end-retaining rings;

Fig. 4 illustrates the manner in which a shell may be made by extruding the moulded material with an inner reenforcement;

Fig. 5 is a view partly in elevation and partly in section of a shell on a core and the retaining rings in position;

Fig. 6 is a vertical sectional view taken on line 6—6 of Fig. 5;

Fig. 7 is an end elevation with a portion of a retaining ring broken away;

Fig. 8 is a plan view of the periphery of the core to illustrate the overlapping relation of the spiral dovetail recesses therein and a corresponding relation of the spiral dovetail splines on the shell which enter these recesses;

Fig. 9 is a longitudinal vertical sectional view of a core and shell assembly upon a shaft;

Fig. 10 illustrates an alternative embodiment of the invention wherein the splines and recesses are straight instead of spiral;

Fig. 11 is a perspective view similar to Fig. 1 of a shell embodying a further form of the invention;

Fig. 12 is a vertical sectional view of the shell illustrated in Fig. 11; and

Fig. 13 illustrates the form of the invention shown in Figs. 11 and 12 as applied to a shell having straight splines and recesses.

Referring more particularly to the drawings, the tire and rim construction illustrated is a type used particularly for heavy duty work on small trucks having wheels of small diameters, say, for example, from 5½ inches to 10 inches or so, adapted to support relatively great loads. At the outset it will be understood that the construction shown may be advantageously adapted to different diameters and to roller structures, such as printing rollers, wringer rollers, typewriter rollers, and, in fact, any device using a molded shell upon a core.

The embodiment of the invention illustrated comprises a core 5 adapted to be mounted upon the end of an axle or shaft and held in position in the usual manner. The invention is directed to the construction and manner of mounting a solid moulded shell 6 upon core 5, in combination with the core itself, which shell 6 is in a form permitting it to be readily slipped on and off core 5 without necessitating any great labor or requiring the taking of the truck or roller out of service at the time.

Core 5 is provided with a series of spiral recesses 8 to receive a series of spiral splines 9 on the inner periphery of shell 6. Spiral recesses 8 may be dovetailed and the spiral portions 9 may be correspondingly formed to fit in these recesses to increase the effective gripping action between the core and the shell. The periphery or tread of shell 6 is continuous and may be integrally formed or moulded with the spiral splines 9 so that these spiral splines may constitute an integral and substantial part of the tread or main body portion. By making the spiral splines 9 a substantial part of the tread or main body portion, the load upon the shell 6 will be more evenly distributed to overcome any tendency of the spiral portions to separate or tear loose from the tread or main body portion. It it found that these spiral splines 9, while in the spiral recesses 8, will be so effectively a part of shell 6 that it will be practically impossible, under any practical load condition, for these spiral splines to pull out of the recesses or tear apart from the tread or main body portion. Moreover, it is found that, by providing the tread or body portion continuous and in a manner making the spiral splines 9 a substantial part thereof, there is a decided tendency for this body portion of the shell to hug core 5 tightly about its entire circumference when subjected to a load strain. The hugging action is attributed to a distribution of the load strain over a proportionately greater part of the shell and further to the carrying of the load strain by a number of spiral splines 9.

Forming recesses 8 in core 5 provides a series of ribs 10 having inwardly slanting walls 11, which walls 11 provide the dovetail formation of recesses 8. Ribs 10 terminate short of the ends of core 5 to provide threaded end extensions 12 and 13, as shown more particularly in Fig. 9. End extension 12 may be the inside with respect to the positioning of the core upon the shaft or spindle 14, and, being externally threaded, may receive a retaining ring 15 which is locked thereto by a screw 16. With retaining ring 15 in position, shell 6 is slipped into position upon core 5 by splines 9 entering recesses 8 at the other end, the shell 6 being rotated about core 5 to complete the entering engagement of the splines in the recesses. Retaining ring 15 projects outwardly beyond the periphery of the ribs 10 to provide an annular shoulder 18 against which the inner edge of shell 6 abuts. In this connection, it will be noted that, in wheels and rollers of small diameters, the tire or roller in the form of a shell may be easily and quickly slipped on and off core 5. Opposite end 13 is likewise threaded to receive a second retaining ring 19 of a diameter sufficient to provide an annular shoulder 20 which functions to retain shell 6 upon core 5 at this end of the wheel. The spiral formation of splines 9 and recesses 8 is in a direction advantageously tending to increase the gripping action between shell 6 and core 5 when traction is in a forward direction. Rolling the wheel in a backward direction does not dislodge shell 6 from core 5, due to the annular shoulder 20 of retaining ring 19. Screw 21 may be employed to lock retaining ring 19 to threaded end 13 of core 5.

The assembly of the tire and rim construction disclosed herein is illustrated in Fig. 9. An inner rib 22 suitably located internally on core 5 provides the necessary shoulders for maintaining roller bearings 23 and 24 in position. The inner and outer retaining races of the roller bearings 23 and 24 may be seated within core 5 and against the shoulders provided by inner rib 22. Shaft 14 may have a plate 25 to maintain roller construction 23 in position against the shoulders of rib 22, while the end of shaft 14 may be threaded at 26 to receive plate 27 and its cooperating part 28 to maintain roller construction 24 against the shoulder of rib 22. A plate disc 29 may be mounted in internally threaded relation in end 13 to act as a cap to close off the interior of core 5. Spanner holes 30 may be provided in plate disc 29 to receive the lugs of a spanner wrench for threading or unthreading this disc plate 29 in position. Similar spanner openings 31 may be provided in each of retainer rings 15 and 19 so that a spanner wrench may be used to mount or remove these retainer rings from their ends.

A wedge fit between the spiral dovetail recesses 8 and the spiral dovetail splines 9 may be found desirable in that it will add to the rigidity of the splines 9 and provide a relatively tighter fit in recesses 8. To this end recesses 8 may be tapered from the outer end 13 to the inner end 12 of core 5. Fig. 8 illustrates the periphery of core 5. It will be observed that the width of recesses 8 at their forward opening at end 13, as represented by line $a$ in Fig. 8, is slightly greater than the width of these recesses at end 12, as represented by line $b$. Splines 9 are tapered accordingly, as illustrated in Fig. 1. End 32 of each spline 9 is somewhat wider than end 33. Tapering splines 9 and recesses 8 facilitate the mounting of shell 6 upon core 5, and, as stated, increases the gripping action between these parts by the traction of the wheel in a forward direction. It is also found that the ease of mounting shell 6 upon core 5 may be enhanced by slightly tapering the shell and core inwardly from end 13 to end 12. The extent of this taper may be varied according to the conditions of use to which the invention is put. To illustrate the extent of the taper, line c represents the thickness of the tread or body portion of shell 6 at the entering end which abuts against retainer ring 15. Line c' represents the thickness of shell 6 at the other end. Line c' is slightly greater than line c and the difference equals the taper from the entering end to the opposite end of shell 6.

Recesses 8 and splines 9 may likewise be tapered. The depth of recesses 8 at their entering ends is represented by line d' which is slightly greater than the opposite ends of these recesses, represented by line d. Splines 9 are, therefore, tapered to the same extent as the recesses 8, thereby greatly facilitating the slipping of core 6 on shell 5 and providing a more efficient gripping action between the splines and recesses.

While it is desirable to provide the recesses 8 and the splines 9 of spiral formation, due to the unique manner in which such spiral formation will allow the shell 6 to be slipped into position upon core 5 and securely held thereon, I do not intended limiting the invention thereto when other features of the invention are embodied because I find that such recesses 8 and splines 9 may also be made straight. Such a structure is shown in Fig. 10. In this form the tire may likewise be in the form of a shell adapted to be slipped in endwise upon the core and the rings 15 and 19 may be used to hold this shell against endwise displacement from the core. The recesses 8 in the periphery of the core may be made straight to receive similarly formed splines 9 on the interior of the shell.

Also, I find that such recesses 8 and splines 9 need not be limited to a dovetail formation because the advantages of a spiral formation may be realized when other formations are used, say, for example, the ordinary spiral thread may be used where cooperating thread portions may be formed upon the periphery of the core and the interior of the shell.

The characteristic features of the invention may be employed in the application of a rubber or like shell to rollers for different uses. It is found that the structure herein disclosed may be used in mounting a rubber shell as a wringer roller, a typewriter roller, a printing roller, and, in fact, as stated, wherever it is desirable to mount a shell—upon a core—although the feature of quick replacement, due to wear, may not be an essential item of consideration. This is due to the fact that the structure herein disclosed permits a simple and inexpensive form of attachment of the shell to the core and allows the shell and core to be made and assembled at less cost, further assuring, on the other hand, a secure and permanent attachment and overcoming the possibility of the shell becoming loose upon the core.

Shell 6 may be formed in any desirable manner, there being shown, however, in Fig. 4, a method of extruding the moulded material 35 with a reenforcing member 36. The mould 37 carried upon shaft 38 may be formed similarly to that of the core, the recesses 39 in the mould receiving moulded material 35 and the reenforcing member 36 to form splines 9. As mould 37 rotates, roller 40 operates upon material 35 to depress it and the reenforcing member 36 in the recesses 39. The pressure applied by roller 40 forms the shell 6 by forcing the reenforcing member 36 about the surfaces of the mould and into the recesses, the moulded material 35 adhering to the reenforcing member 36 and being pressed into position by this roller. It will be observed that shell 6 may be made of a homogeneous mass of moulded material, such as rubber or the like, with the reenforcing member 36 lining the interior thereof. I do not wish to limit the invention to constructing shell 6 in this manner, but I find that reenforcing member 36 advantageously strengthens splines 9 so that they remain in tight gripping relation in recesses 8 and facilitate the action of the body portion of the shell 6, tending to hug the core about its entire circumference by a load strain. It will be apparent that reenforcing members 36 may be omitted and moulded material 35, such as rubber or other suitable substance, be made of laminations of varying hardness. The splines may be of harder moulded material than the tread surface. Proper vulcanizing operations will homogeneously unite the laminations into an integral formation. Variations in the construction of shell 6 may be resorted to without departing from the scope of the invention.

Shell 6 may be moulded as a unit at low cost and made to have sufficient strength between splines 9 and the main body portion to prevent the splines 9 from tearing away. Moreover, it is found that providing the shell 6 as I have shown herein tends to lessen the possibility of such separation between the splines and the main body portion, due to a more equal distribution of the strain over a greater part of the shell.

Reenforcing member 36, illustrated in Fig. 4, may be of fabric or other material of a toughness greater than rubber, or the material out of which shell 6 may be made. However, if it is found desirable, this reenforcing material may take the form of a metallic lining 40, as shown in Figs. 11 to 13, inclusive. Metallic lining 40 may be made of pressed sheet metal or may be made in any form so as to provide a substantially reenforced lining for the inner surface of shell 6 which will reenforce splines 9 so that they will be securely held in recesses 8 of core 5. This metal lining 40 may be applied to the spiral spline shell shown in Fig. 11, or to the straight spline shell shown in Fig. 13.

Due to the compact formation of shell 6, splines 9 may be arranged in relatively close formation and of a pitch to cause the line of traction, that is, the line of engagement of the tread surface, to extend crosswise of more than one spline. This feature is illustrated in Fig. 8. The line of traction indicated by line e—e extends crosswise of a plurality of splines 9 so that the load strain will be more uniformly distributed and not borne by a single spline. I find that in so distributing the load strain over a number of splines 9, there is a tendency for this load strain to be distributed over a proportionately greater part of the body or tread of shell 6 so as to cause shell 6 to hug core 5 more effectively and the splines 9 to have a greater gripping action in recesses 8.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a device of the class described, a core having a series of spiral dovetail recesses in its periphery, a resilient shell for said core having spiral dovetail portions fitting into said recesses by a spiral movement, and means for locking said shell on said core.

2. In a device of the class described, a core having a series of over-lapping spiral recesses in its periphery, a resilient shell for said core having corresponding spiral portions fitting into said recesses by a sliding movement, and means for preventing lateral displacement of said shell from said core.

3. In a device of the class described, a core having a series of spiral dovetail recesses in its periphery, a resilient shell for said core having corresponding spiral dovetail portions fitting into said recesses by a spiral movement, and means for locking said shell on said core including a ring carried by said core.

4. In a device of the class described, a core having a series of spiral recesses therein, a resilient shell for said core having spiral splines fitting into said recesses by a spiral movement, said recesses and said splines tapering to provide a wedge fit, and means for locking said shell on said core.

5. In a device of the class described, a core having a series of spiral recesses therein, a moulded rubber shell for fitting over said core, spiral splines on said rubber shell for engaging in said recesses, means at one end of said core permitting said shell to be fitted over said core from the opposite end by a spiral movement, and means at said opposite end of said core to lock said shell in position.

6. In a device of the class described, a cylindrical base having spiral recesses in its periphery, a shell for said base, said shell being of moulded rubber and having moulded spiral portions for fitting in said spiral recesses by a spiral movement, and shoulders at both ends of said base to hold said shell in position on said base, at least one of said shoulders being removable.

7. In a device of the class described, a cylindrical core having spiral dovetail recesses therein, a moulded resilient shell substantially of homogeneous mass having spiral dovetail splines fitting in said spiral recesses, and means for holding said shell on said core, said holding means being carried by said core, said splines and said recesses being constructed and arranged to cause said shell to hug said core more snugly when traction load is applied to said shell.

8. In a device of the class described, a cylindrical core having a series of recesses in its periphery, a resilient shell substantially of homogeneous mass having splines fitting in said recesses, said splines being reinforced to increase their rigidity and their retaining grip in said recesses, and means for locking said shell on said core.

9. A roller construction comprising a moulded resilient body formed as a shell for use upon a core, and having a series of integrally formed spiral splines spaced about its inner periphery for interlocking engagement in correspondingly formed recesses of the core, said splines being arranged on said shell to distribute the traction load substantially equally over a plurality of said splines.

10. In a device of the class described, a core having a series of recesses in its periphery, a substantially homogeneous moulded non-metallic shell having internal splines fitting in said recesses, and a metallic lining between said core and said shell, said metallic lining snugly fitting substantially the entire outer surface of said core and the inner surface of said shell, said interengaging splines and recesses being constructed and arranged to prevent relative rotary movement of said core and shell and to cause said shell to hug said core more snugly when traction load is applied to said shell.

11. In a device of the class described, a core having a series of recesses in its periphery, a substantially homogeneous moulded non-metallic shell having internal splines fitting in said recesses, and a metallic lining between said core and said shell, said metallic lining snugly fitting substantially the entire outer surface of said core and the inner surface of said shell, said interengaging splines and recesses being constructed and arranged to prevent relative rotary movement of said core and shell and to cause said shell to hug said core more snugly when traction load is applied to said shell, said core being longitudinally insertable in said shell.

12. A roller of the character described, comprising a core having a multiple dovetail external thread, a rubber-like continuous tire having a corresponding internal thread, and means for clamping said tire to retain it against longitudinal movement.

13. A roller of the character described, comprising a core having a multiple dovetail external thread, a rubber-like continuous tire having a corresponding internal thread, any radial plane of said roller intersecting a plurality of said threads.

14. A roller of the character described, comprising a core having a multiple dovetail external thread, a rubber-like continuous tire having a corresponding internal thread, all of said threads tapering longitudinally thereof to tend to limit the threading-on movement in one direction whereby said tire and core are wedged together.

15. A roller of the character described, comprising a core having a multiple dovetail external thread, a rubber-like continuous tire having a corresponding internal thread, said core being externally tapered, and said tire being correspondingly internally tapered.

16. A roller of the character described, comprising a core having an external multiple thread, and a rubber-like continuous tire body having a corresponding internal thread, the composition of said tire body being such that at least a portion of the material in said threads is less resilient than the tread portion.

17. A roller of the character described, comprising a core having an external multiple thread, and a rubber-like continuous tire body having a corresponding internal thread, the tread portion of said tire being materially more resilient than the surface portion of the threads.

EDWIN E. WITTKOPP.